United States Patent
Kurachi et al.

(10) Patent No.: US 11,147,278 B2
(45) Date of Patent: Oct. 19, 2021

(54) DUSTING POWDER SPRINKLING APPARATUS

(71) Applicant: YUTAKA MFG. CO., LTD., Kounan (JP)

(72) Inventors: Masayasu Kurachi, Kounan (JP); Atsushi Takahara, Kounan (JP)

(73) Assignee: YUTAKA MFG. CO., LTD., Kounan (JP)

( * ) Notice: Subject to any disclaimer, the term of this patent is extended or adjusted under 35 U.S.C. 154(b) by 0 days.

(21) Appl. No.: 17/109,414

(22) Filed: Dec. 2, 2020

(65) Prior Publication Data
US 2021/0186033 A1    Jun. 24, 2021

(30) Foreign Application Priority Data
Dec. 24, 2019  (JP) .............................. JP2019-232410

(51) Int. Cl.
| | |
|---|---|
| A21C 9/04 | (2006.01) |
| A23P 20/12 | (2016.01) |
| B05C 19/00 | (2006.01) |
| B05C 19/06 | (2006.01) |
| B05C 19/04 | (2006.01) |
| A23G 3/20 | (2006.01) |
| A21C 15/00 | (2006.01) |

(52) U.S. Cl.
CPC ............... *A21C 9/04* (2013.01); *A23P 20/12* (2016.08); *B05C 19/008* (2013.01); *B05C 19/04* (2013.01); *B05C 19/06* (2013.01); *A21C 15/002* (2013.01); *A23G 3/2076* (2013.01)

(58) Field of Classification Search
CPC ...... A21C 9/04; A21C 15/002; A23G 3/2076; B22C 5/08; B01D 46/0002; B01D 46/0005; B02C 17/02; B05B 5/1683; B05D 1/06; A23P 20/12; B07B 9/00; B07B 1/52; B07B 1/522; B07B 1/524; B05C 19/00; B05C 19/008; B05C 19/04; B05C 19/06
USPC ........................................................ 118/13
See application file for complete search history.

(56) References Cited

U.S. PATENT DOCUMENTS

| | | | | |
|---|---|---|---|---|
| 1,546,411 A * | 7/1925 | Jeffreyr | .................... | A21C 9/04 222/486 |
| 2,390,195 A * | 12/1945 | Tascher | .................... | A21C 9/04 118/13 |
| 2018/0098547 A1* | 4/2018 | Frazier | .................. | B65D 83/06 |

FOREIGN PATENT DOCUMENTS

JP        55-55581 Y2    12/1980

* cited by examiner

*Primary Examiner* — Laura Edwards
(74) *Attorney, Agent, or Firm* — Ladas & Parry LLP; Malcolm J. MacDonald

(57) ABSTRACT

A dusting powder sprinkling apparatus comprises a frame body, a hinge, a hook, and a toggle latch. The frame body presses the entire circumference of a mesh body, excluding the portion provided with through-holes, along the outer peripheral surface side of the mesh body to fix the mesh body to the hopper. The hinge rotatably fixes a first frame side extending along the rotation axis direction of the brush to the outlet of the hopper. The hook is fixed to a second frame side extending along the rotation axis direction of a brush in the frame body. A tip portion of the hook projects from the outer periphery of the frame body. The toggle latch is fixed to the outlet of the hopper facing the hook and is capable of engaging with the tip of the hook.

1 Claim, 7 Drawing Sheets

DUSTING POWDER SPRINKLING APPARATUS

CROSS-REFERENCE TO RELATED APPLICATIONS

This application claims priority to Japanese patent application serial number 2019-232410 filed Dec. 24, 2019, the contents of which is incorporated herein by reference in its entirety for all purposes.

BACKGROUND

The present invention relates to a dusting powder sprinkling apparatus.

In the production of noodles, such as udon noodles or soba noodles, or skins, such as dumpling skins and wonton skins, a dusting powder sprinkling apparatus is used to sprinkle flour on the surface of the material. In some dusting powder sprinkling apparatuses, the dusting powder is sprinkled through a mesh body having a large number of through-holes, so that the dusting powder is spread substantially evenly within a desired range. For instance, the dusting powder on the surface of the mesh body may be brushed by the bristles of a rotating brush so that the dusting powder is efficiently sprinkled from the through-holes of the mesh body.

SUMMARY

The dusting powder sprinkling apparatus of the present disclosure may include a hopper, a mesh body, a brush, a frame body, a hinge, a hook, and a toggle latch. The hopper may be funnel-shaped and may contain a dusting powder. The mesh body may be attached to the lower part of the hopper forming an outlet through which the dusting powder may pass. The mesh body is configured to close the outlet. The portion of the mesh body closing the outlet may be formed in a downwardly convex arc surface. The mesh body may have a large number of through-holes provided on the arc surface through which the dusting powder pass. The brush may be rotatably provided within the hopper, so that the tip of the brush may rotate along the inner peripheral surface side of the arc surface of the mesh body. The frame body may press the entire circumference of the mesh body, excluding the portion provided with the through-holes, from the outer peripheral surface side of the arc surface of the mesh body and at the edge portion of the arc surface of the mesh body in order to fix the mesh body to the hopper. The hinge may rotatably fix a first frame side, which extends along the rotation axis direction of the brush, to the outlet of the hopper. The extension direction of the first frame side may be set as the rotation axis direction. The hook may be fixed to a second frame side of the frame body, which extends along the rotation axis direction of the brush. A tip portion of the hook may project from the outer periphery of the frame body. The toggle latch may be fixed to the outlet of the hopper at a side corresponding to the hook. The toggle latch may be capable of engaging with the tip of the hook. A flange portion, which may be formed rising in a direction perpendicular to the surface of the hopper, may be provided at both the fixing portion of the hinge located at the outlet of the hopper and the fixing portion of the toggle latch. The fixing portion of the hinge at the outlet of the hopper and the fixing portion of the toggle latch may be provided at the respective flange portions. The edge portion of the mesh body, which may abut on the outlet, and the frame body, which may press the edge portion, may both be bent so as to face each other and overlap the flange portion in a state where the mesh body closes the outlet of the hopper. The hinge may have a pair of mounting pieces which are freely combined so that their relative angles may be changed around the hinge axis. One of the pair of mounting pieces may be fixed to the surface of the hopper on a side of the hopper away from the outlet of the hopper. The mounting piece may be positioned away from the flange portion via a spacer, which has a height corresponding to the height of the flange portion measured from the surface of the hopper. The other of the pair of mounting pieces may be fixed to the frame body. The hinge shaft may be arranged along the edge of the frame. The toggle latch may include a base, a toggle lever, and a latch portion. The base may be fixed to the hopper. The toggle lever may be rotatably fixed to the base. The latch portion may be rotatably fixed to the toggle lever at a position away from the center of rotation thereof. The tip portion of the latch portion may be capable of engaging with the tip portion of the hook. The base may be fixed to the surface of the hopper on the side of the hopper away from the outlet of the hopper. The base may be positioned away from the flange portion via a spacer, which has a height corresponding to the height of the flange portion measured from the surface of the hopper.

According to the present disclosure, the mesh body, which may be attached so as to open and close the outlet for the dusting powder in the hopper, may be attached to and detached from the flange portion of the outlet of the hopper using the frame body. The frame body may be rotatable about hinge and may be fixed at the outlet of the hopper by a toggle latch. Therefore, the mesh body may be easily attached and detached using only a one-touch operation of the toggle latch. Accordingly, the productivity of manufacturing noodles, or the like, may be increased.

Also, according to the present disclosure, all portions of the toggle latch except the tip of the latch portion may be arranged on a side of the outlet away from than the flange part of the hopper. Therefore, it is possible to prevent dusting powder from the outlet of the hopper from adhering to the toggle latch. As a result, it is possible to suppress various problems, such as the toggle latch becoming difficult to operate due to dusting powder adhering to the toggle latch.

DETAILED DESCRIPTION

In such a dusting powder sprinkling apparatus previously described, the mesh body is structured to be removable from the main body of the dusting powder sprinkling apparatus. This may be done for replacement of the mesh body itself or for removing a clog within the brush or mesh body. Specifically, the mesh body is fastened and fixed to the lower end of a hopper that houses the dusting powder with bolts and nuts.

However, in the case of the above-mentioned dusting powder sprinkling apparatus, it is necessary to fasten and remove the bolts and nuts each time the mesh body is attached or detached. This reduces the productivity of manufacturing noodles or the like.

An object of the present disclosure is that, regarding a dusting powder sprinkling apparatus in which a mesh body for sprinkling dusting powder is capable of being attached and detached in order to remove a clog, etc., the mesh body may be attached and detached efficiently using a one-touch operation. Accordingly, the productivity of manufacturing noodles and the like can be improved.

Figure 1:
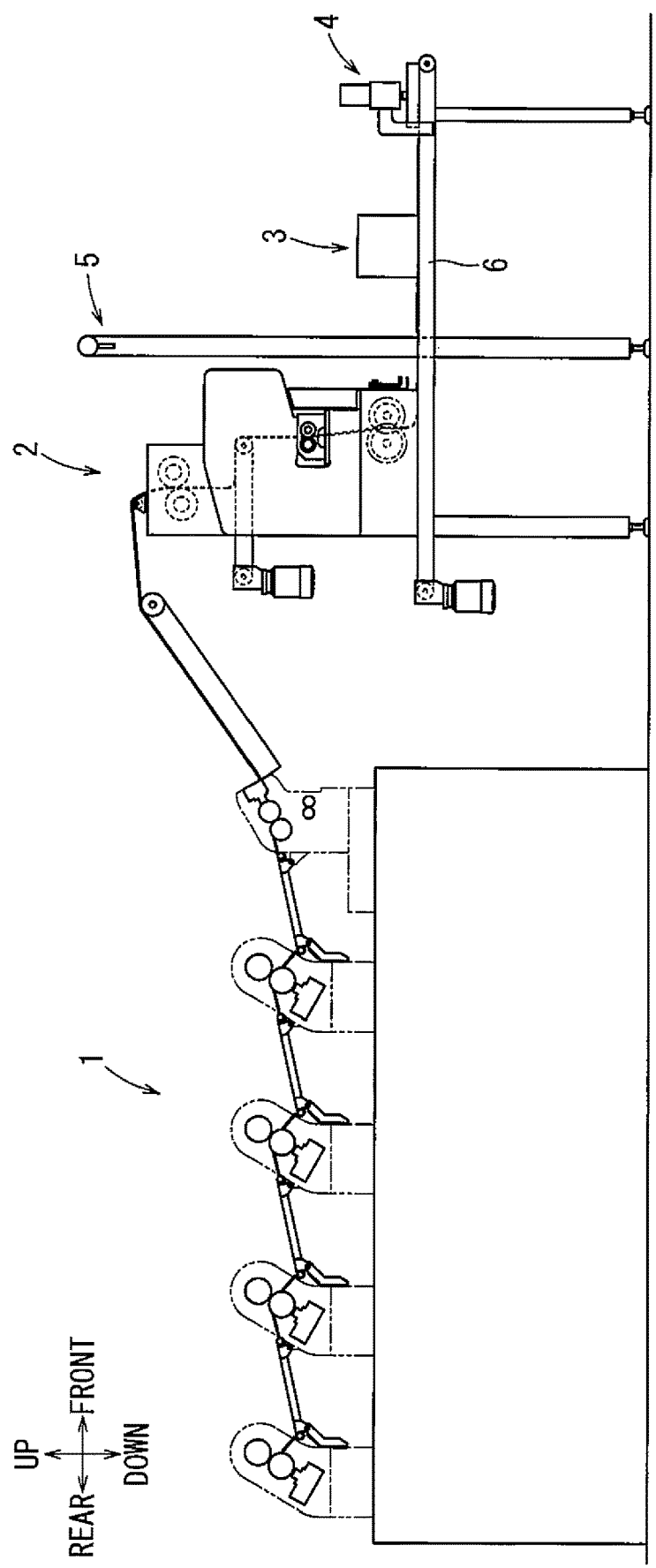
FIG. 1 is a side view showing an example of a noodle manufacturing apparatus to which an embodiment of the dusting powder sprinkling apparatus of the present disclosure is applied.

FIG. 1 shows an overview of a noodle manufacturing apparatus. The noodle manufacturing apparatus may include a continuous rolling mill 1 and a noodle manufacturing machine 2. In the continuous rolling mill 1, the noodle strip to be made into noodles may be sequentially passed through a plurality of rolling mills in order to sequentially reduce the thickness of the noodle strip to an appropriate thickness. In the noodle manufacturing machine 2, the noodle strip supplied from the continuous rolling mill 1 may be shredded into noodles, and the noodles may be further cut into appropriate lengths. The noodles cut in this way may be conveyed by a conveyor 6. A dusting powder sprinkling apparatus 3 may be arranged on the conveyor 6, and dusting powder may be sprinkled on the noodles so that the shredded noodles do not bind to each other. A width-aligning roller 4 may be arranged on the most downstream side of the conveyor 6, and the noodles sprinkled with flour may be width-aligned toward the center side of the conveyor 6, so that they may be bundled for shipping. A crane tower 5 provided adjacent to the noodle manufacturing machine 2 may be used to lift and move the cutting blade when exchanging the cutting blade inside the noodle manufacturing machine 2.

FIGS. 2 to 7 show the dusting powder sprinkling apparatus 3 as an embodiment of the present disclosure. In each figure, the arrows indicate the directions in the state where the dusting powder sprinkling apparatus 3 is arranged in the noodle manufacturing apparatus as shown in FIG. 1. The downstream side of the conveyor 6 is defined as the "front" direction. The explanation regarding the directions will be described with reference to the directions defined above.

Figure 2:
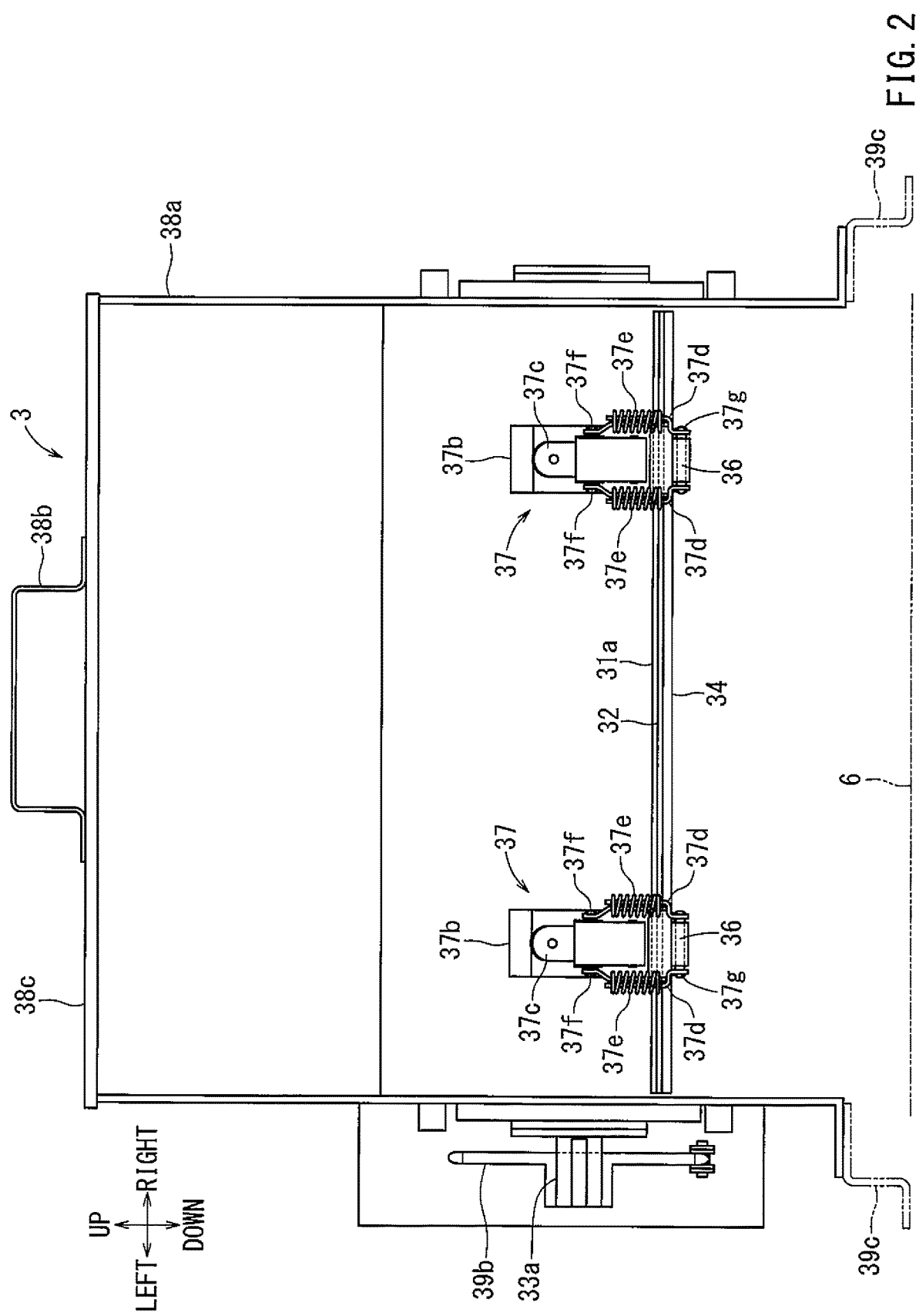
FIG. 2 is an enlarged front view of the embodiment.
Figure 3:
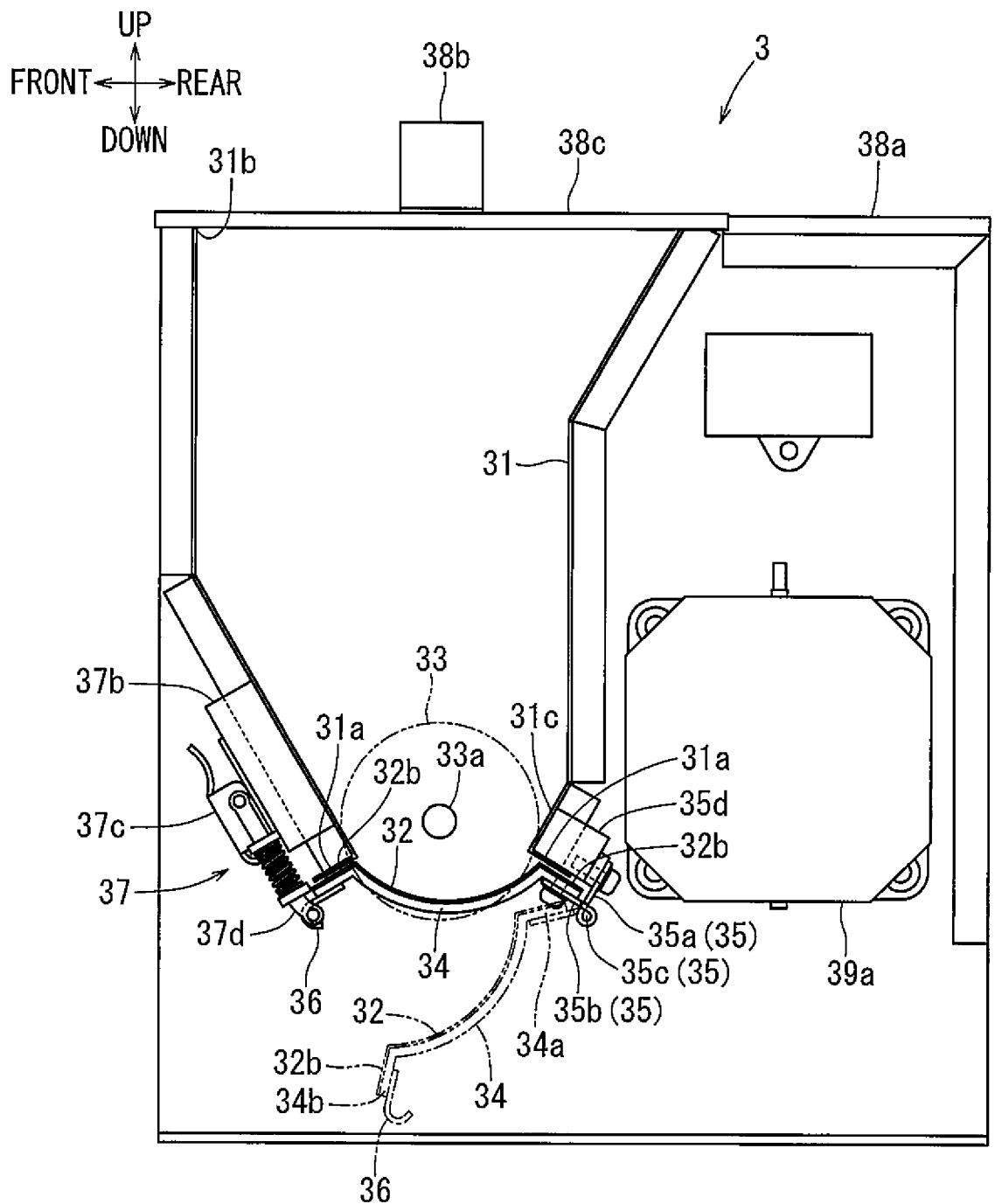
FIG. 3 is an enlarged partial cross-sectional side view of the embodiment.

As shown in FIGS. 2 and 3, the dusting powder sprinkling apparatus 3 may include a housing 38a, which may be tunnel-shaped, and may be fixed via fixing brackets 39c so as to straddle the conveyor 6 in the right-left direction. A hopper 31 for accommodating a dusting powder, such as bread flour, potato starch, or buckwheat flour, may be formed in the housing 38a. The hopper 31 may be funnel-shaped. The upper part of the hopper 31 may be opened to form an input port 31b for inputting the dusting powder. The input port 31b may be covered by a lid 38c, so as to be openable and closable. A handle 38b may be integrally provided on the upper part of the lid 38c, so that the operator may easily grasp the lid 38c when opening and closing the lid 38c.

The lower part of the hopper 31 may form an outlet 31c, which has an opening area narrower than that of the input port 31b. The opening size of the outlet 31c may be narrowed in the front-rear direction (see FIG. 3), but have the same width as the input port 31b in the right-left direction (see FIG. 6). At the front and rear positions of the outlet 31c, a flange portion 31a may be formed by bending the lower end of the hopper 31 in a right-angled direction (it does not have to be exactly a right angle).

The outlet 31c may be provided with a mesh body 32. The mesh body 32 may have a large number of through-holes 32a through which the dusting powder may pass (see FIGS. 5 and 6). The mesh body 32 may be attached so as to close the outlet 31c. The mesh body 32 may have an arc shape in which the portion closing the outlet 31c is convex downward. The arc shape may be formed such that the central axis of the arc surface extends in the right-left direction. Both end portions of the arc of the arc-shaped mesh body may be bent in the radial direction of the arc surface so as to form a bent portions 32b. When the mesh body 32 is attached so as to close the outlet 31c, the bent portion 32b may abut on the lower surface of the flange portion 31a of the frame body 34, in a face-to-face manner.

Figure 6:
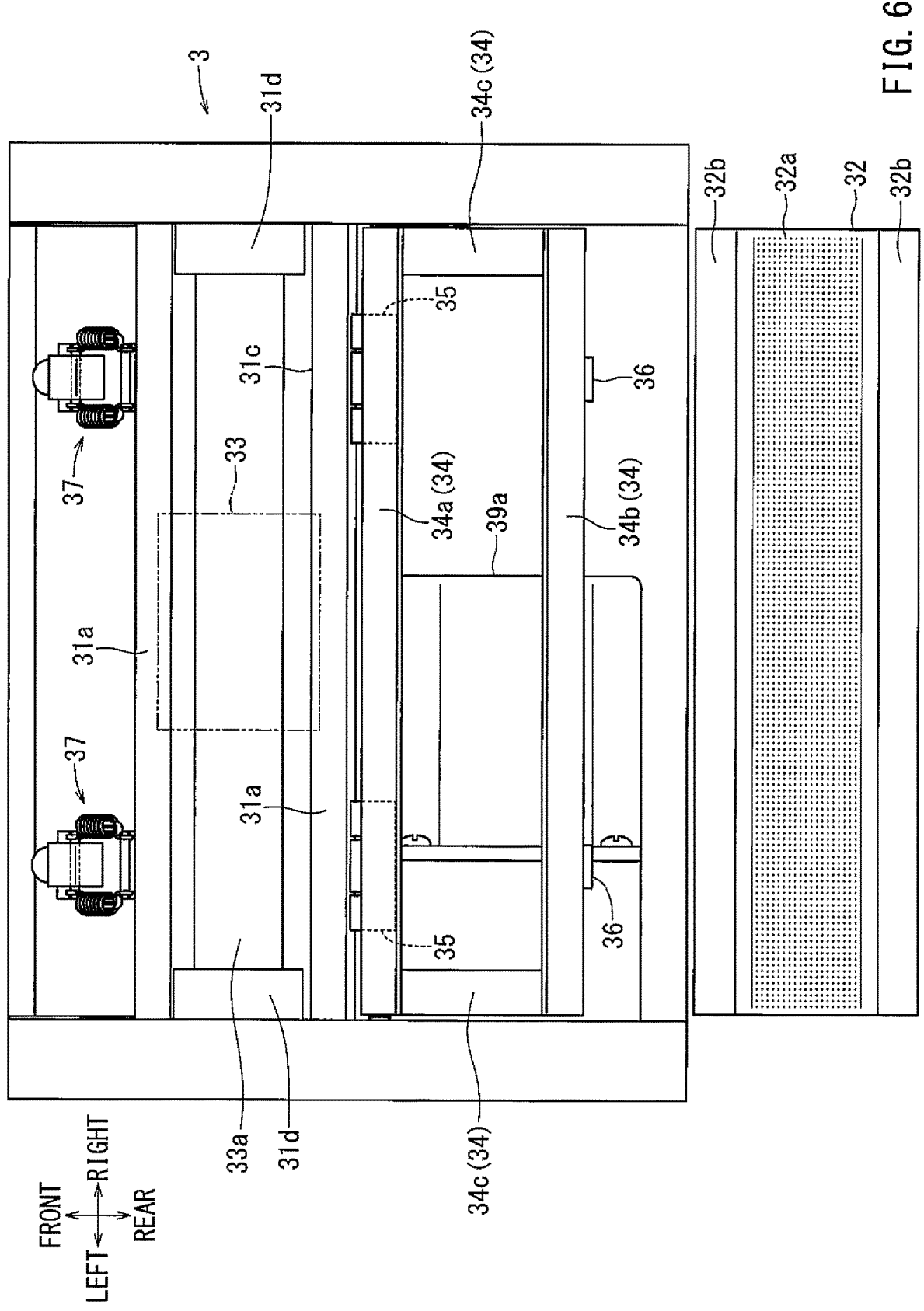
FIG. 6 shows a state in which the mesh body has been removed.

A brush 33 may be provided inside the hopper 31 in the vicinity of the outlet 31c. The brush 33 may be rotatably fixed to the hopper 31 by a rotation shaft 33a extending in the right-left direction. According to the present embodiment, the brush 33 may be provided only at the central portion of the rotation shaft 33a in the right-left direction, as shown in FIG. 6. However, the brush 33 may be provided across the entire right-left direction of the rotation shaft 33a, so as to correspond to the entire right-left direction of the mesh body 32. When the brush 33 is rotated by the rotation shaft 33a, the tip/bristles of the brush 33 may be moved while contacting the inner peripheral surface of the mesh body 32. This causes the dusting powder placed on the mesh body 32 to be pushed through the through-holes 32a. The rotation shaft 33a may be rotationally driven, via a speed reducer 39b, by a motor 39a. The motor 39a may be fixed to the inner wall of the housing 38a.

A frame body 34 may be provided to hold the mesh body 32 in a state where the outlet 31c of the hopper 31 is closed. The frame body 34 may have a frame shape so as to press the entire circumference of the edge portion of the mesh body 32 from the lower surface side (the outer peripheral surface side of the arc shape of the mesh body 32), except for the central portion where the through holes 32a are formed (see FIG. 6). A first frame side 34a, which extends in the right-left direction (the direction of the rotation shaft 33a of the brush 33), of the frame body 34 may press against one of the flange portions 31a of the flange portions, with one of the bent portions 32b of the mesh body 32 sandwiched therebetween (see FIG. 4). The first frame side 34a of the frame body 34 may correspond to one of the frame sides of the present disclosure. Further, a second frame side 34b, which is parallel to the first frame side 34a, of the frame body 34 may press against the other flange portion 31a, with the other bent portion 32b of the mesh body 34 sandwiched therebetween. The second frame side 34b of the frame body 34 may correspond to the other side of the frame side of the present disclosure. Third frame sides 34c of the frame body 34 may be formed on both ends of the left and right sides of the first frame side 34a and the second frame side 34b. The third frame sides 34c may connect the first frame side 34a to the second frame side 34b. The third frame side 34c may be formed in an arc shape, so that it may be concentric with the arc shape of the mesh body 32 and may follow the arc shape of the mesh body 32. Therefore, the left and right ends of the mesh body 32 may be sandwiched between an arc surfaces 31d of the hopper 31 the third frame sides 34c (see FIG. 6). The arc surfaces 31d may be formed at the lower part of the hopper 31.

The first frame side 34a may be rotatably fixed to the outlet 31c of the hopper 31 by a pair of hinges 35, the hinges 35 being distributed in the front-rear direction. Each hinge 35 has a pair of mounting pieces, whose relative angles may be freely changed around a hinge shaft 35c. A first mounting piece 35a, which is one of a pair of mounting pieces, may be fixed to the surface forming the outlet 31c of the hopper 31. It may be attached in this way through a spacer 35d. The spacer 35d may function to eliminate a level difference, so that the first mounting piece 35a may be fixed to the outlet 31c of the hopper 31, even if the flange portion 31a is located at the outlet 31c of the hopper 31. Therefore, the height of the spacer 35d, the height from the surface of the outlet 31c of the hopper 31, is substantially equal to the height of the flange portion 31a projecting from the same surface, or slightly higher than the height of this flange portion 31a. For the hinge 35, the first frame side 34a of the frame body 34 may be fixed to a second mounting piece 35b of the pair of mounting pieces. The hinge shaft 35c may be arranged along the tip of the second mounting piece 35b.

A pair of hooks 36, which are configured to engage with a latch portion 37d of a toggle latch 37, may be dispersedly arranged in the right-left direction. The hooks 36 may be fixed on the second frame side 34b. Each hook 36 may be positioned so that its tip portion may project from the outer periphery of the frame body 34 (see FIG. 4).

A pair of toggle latches 37 may be fixed to the surface portion of the hopper 31. The toggle latches 37 may be positioned facing each hook 36 when the frame body 34 is pressed against the lower surface of the flange portion 31a, with the mesh body 32 interposed therebetween. The toggle latch 37 may be a known type of toggle latch. The toggle latch 37 may be fixed to the surface of the outlet 31c of the hopper 31 via the spacer 37b. Similar to the spacer 35d for the hinge 35, the spacer 37b for the toggle latch 37 may eliminate a level difference, so that the toggle latch 37 may be fixed to the surface of the outlet 31c of the hopper 31 even if the flange portion 31a is located at the outlet 31c of the hopper 31. Therefore, the height of the spacer 37b from the surface of the outlet 31c of the hopper 31 may be substantially equal to the height of the flange portion 31a from the same surface, or slightly higher than the height of this flange portion 31a. Thereby the frame body 34 may be pressed and fixed to the flange portion 31a of the hopper 31 by engaging a tip portion 37g of the latch portion 37d of the toggle latch 37 with the tip portion of the hook 36.

Figure 7:
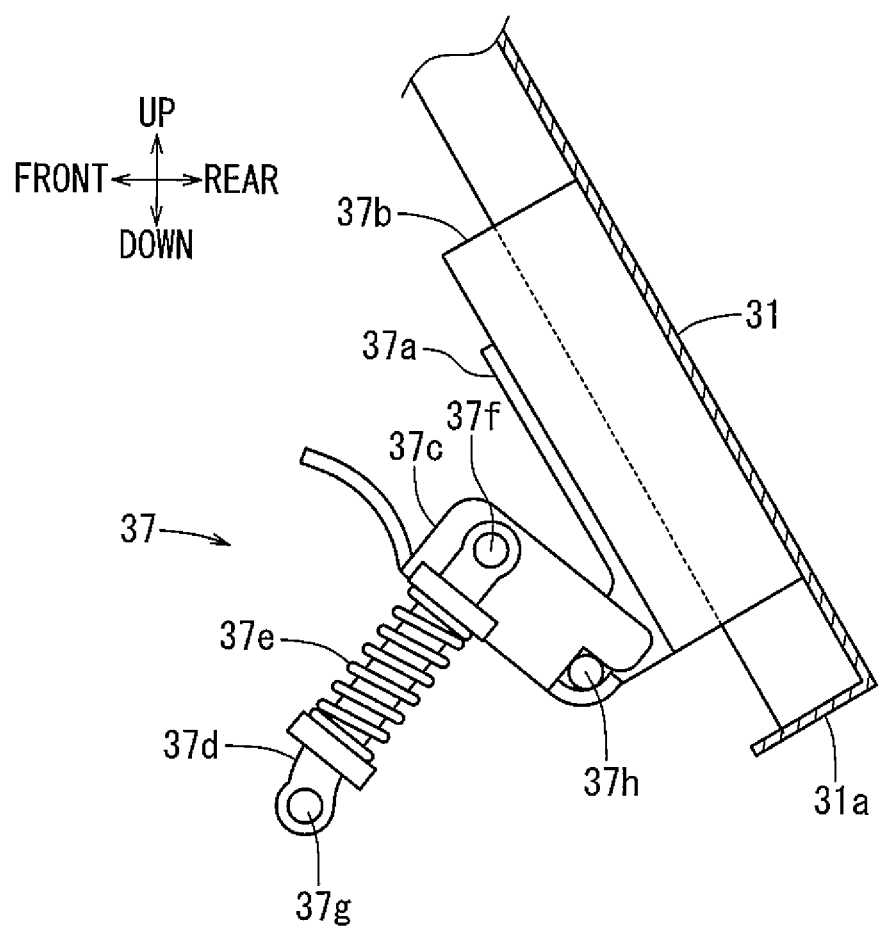
FIG. 7 is an enlarged side view of a toggle latch of the embodiment, with a latch part removed from a hook.

FIG. 7 is an enlarged side view of the toggle latch. The toggle latch 37 may include a base 37a, a toggle lever 37c, and a latch portion 37d. The base 37a may be fixed to the hopper 31 via the spacer 37b. The toggle lever 37c may be rotatably fixed to the base 37a by a rotation shaft 37h. The latch portion 37d may be rotatably fixed by a rotation shaft 37f to the toggle lever 37c at a position distant from the center of rotation of the rotation shaft 37h. The latch portion 37d may be capable of engaging with the tip portion of the hook 36 using the tip portion 37g. The latch portion 37d may be configured to expand and contract between the rotating shaft 37f and the tip portion 37g. The latch portion 37d may be energized by a spring 37e in a direction in which the space between the rotating shaft 37f and the tip portion 37g contracts.

Figure 4:
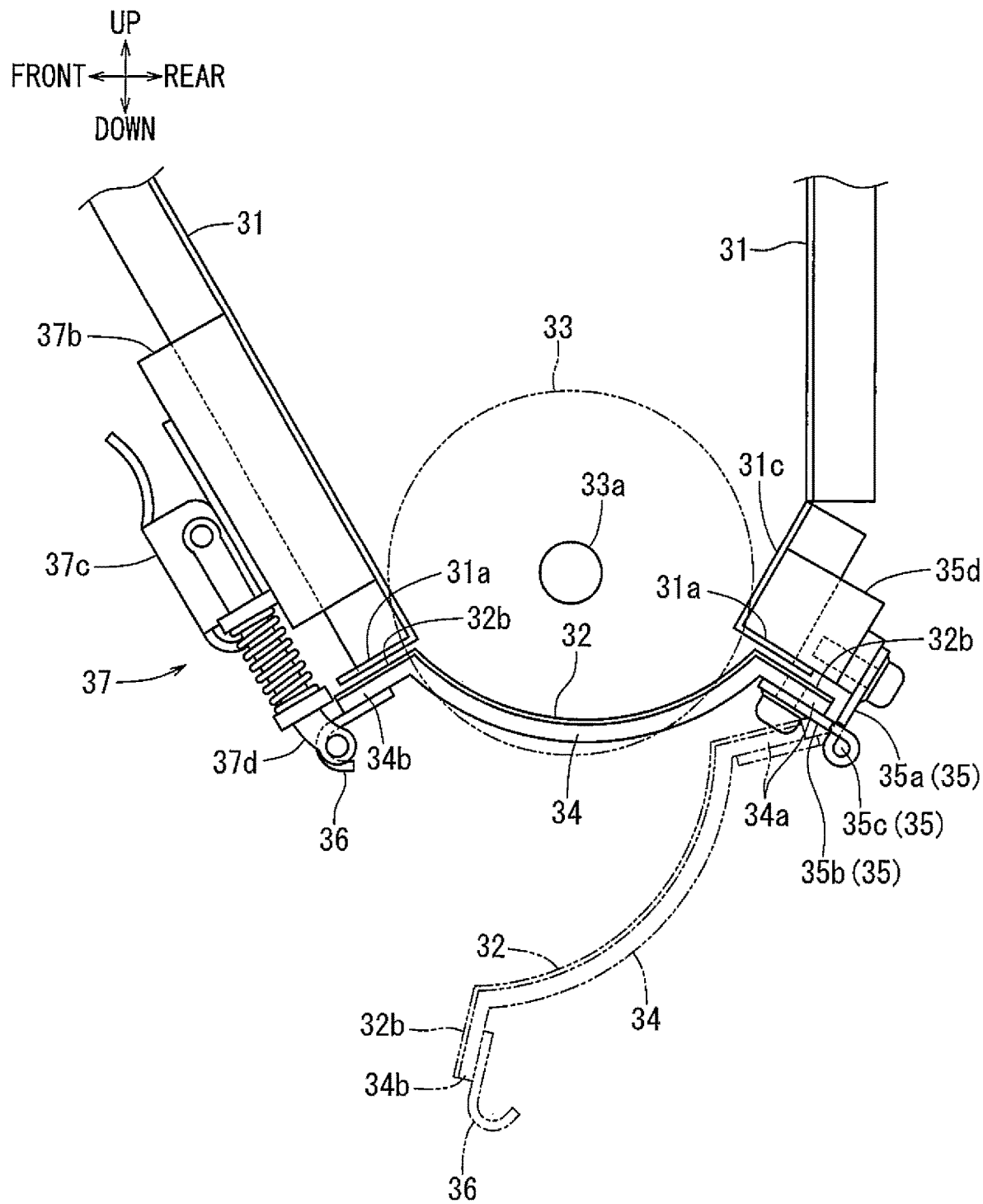
FIG. 4 is an enlarged view of a main part of FIG. 3.
Figure 5:
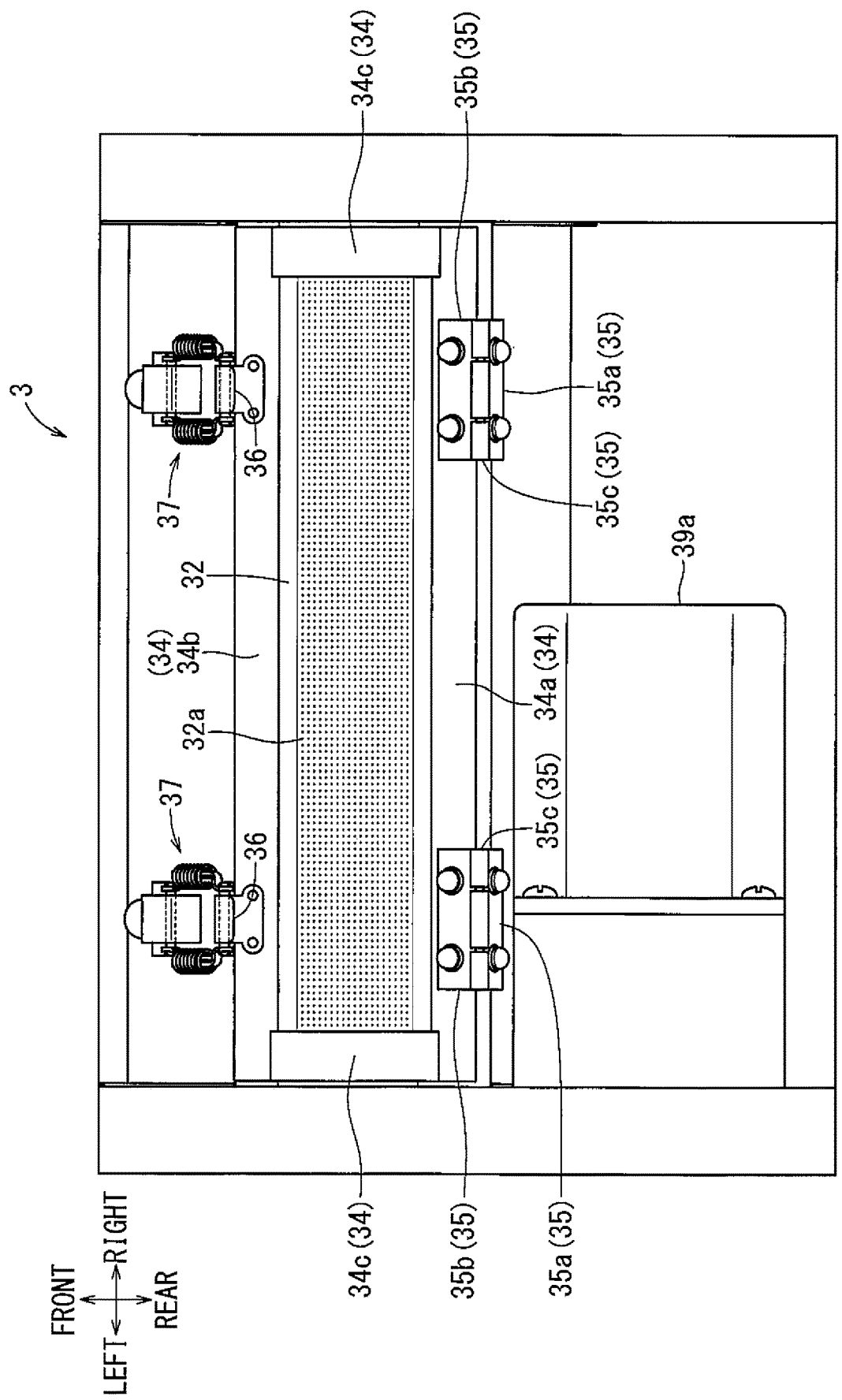
FIG. 5 is an enlarged bottom view of the embodiment.

The mesh body 32 may be interposed between the frame body 34 and the flange portion 31a. The mesh body 32 may be attached to the lower surface of the flange portion 31a of the hopper 31. The toggle lever 37c may be operated so as to be parallel to the base 37a by engaging the tip portion 37g of the latch portion 37d of the toggle latch 37 with the hook 36. As a result, the energizing force of the spring 37e of the latch portion 37d may be applied to the hook 36. Accordingly, the second frame side 34b of the frame body 34 may be strongly pressed and fixed to the lower surface of the flange portion 31a. In FIGS. 3 and 4, in order to make the structure easy to understand, there is a gap respectively between the front and rear flange portions 31a and the front and rear bent portions 32b of the mesh body 32. However, actually, each flange portion 31a and each bent portion 32b are abutted to each other without a gap.

When the mesh body 32 is detached from the flange portion 31a of the hopper 31, for instance for replacement or clog removal, the toggle lever 37c of the toggle latch 37 may be rotated around the rotation shaft 37h in a direction away from the base 37a, as shown in FIG. 7. As a result, the tip portion 37g of the latch portion 37d disengages from the hook 36. This allows the frame body 34 to rotate around the hinge 35. As a result, the mesh body 32 may be detached from the flange portion 31a of the hopper 31.

The mesh body 32 may be easily attached and detached by opening and closing the frame body 34 around the hinge 35. This can be done simply by rotating the toggle lever 37c of the toggle latch 37, as described above. Therefore, according to the dusting powder sprinkling apparatus of the present disclosure, even if the mesh body 32 is attached or detached when it becomes necessary to replace the mesh body 32 or when removing a clog, the productivity of manufacturing noodles, or the like, may be increased as compared with the case where bolts and nuts are used, as is described in the conventional art.

Further, all the portions of the toggle latch 37, except the tip portion 37g of the latch portion 37d, may be arranged on a side of the outlet 31c of the hopper 31 away from the flange portion 31a. Therefore, it is possible to prevent dusting powder scattered from the outlet 31c of the hopper 31 from adhering to the toggle latch 37. As a result, it is possible to suppress various defects, such as the operation of the toggle latch 37 becoming difficult due to dusting powder adhering to the toggle latch 37.

Although the specific embodiments have been described above, the present disclosure is not limited to their appearance and configuration, and various changes, additions, and deletions can be made. For instance, in the above description, an example in which the dusting powder sprinkling apparatus is installed in the noodle manufacturing apparatus is shown. However, the dusting powder sprinkling apparatus of the embodiment may be applied to various other uses. Further, in the above embodiment, an example of the toggle latch 37 is shown. However, any structure may be used as the toggle latch 37 as long as it has substantially the same function of the toggle latch described above. For instance, in the above embodiment, the latch portion 37d of the toggle latch 37 is provided with the spring 37e. However, another type of latch that does not have a spring may be adopted.

What is claimed is:
1. A dusting powder sprinkling apparatus, comprising:
 a hopper having a funnel shape and configured to contain a dusting powder;
 a mesh body configured to be attached to a lower part of the hopper forming an outlet for the dusting power and configured to cover the outlet, a portion of the mesh body closing the outlet being formed in a downwardly convex arc surface and with a plurality of through-holes through which dusting powder may pass;
 a brush rotatably provided in the hopper such that a tip of the brush is configured to rotate along an inner peripheral surface side of the downwardly convex arc surface of the mesh body;

a frame body configured to press an outer peripheral surface side of the downwardly convex arc surface at an edge portion of the downwardly convex arc surface of the mesh body so as to fix the mesh body to the hopper;

a hinge configured to rotatably fix a first frame side, a side extending along a rotation axis direction of the brush, to the outlet of the hopper;

a hook configured to be fixed to a second frame side of the frame body, a side extending along the rotation axis direction of the brush, a tip portion of the hook projecting beyond an outer periphery of the frame body; and a toggle latch configured to be fixed to the outlet of the hopper such that it faces the hook and configured to be engaged with the tip of the hook, wherein:

a flange portion, which rises in a direction substantially perpendicular to a surface of the hopper, is provided at a fixing portion of the hinge located at the outlet of the hopper and a fixing portion of the toggle latch;

the edge portion of the mesh body and a portion of the frame body that presses the edge portion of the mesh body are both bent so as to face each other and to overlap the flange portion in a state where the mesh body closes the outlet of the hopper;

the hinge has a first and second mounting piece that are freely combined so that their relative angle is capable of being changed around their hinge axis, a first spacer has a height substantially the same as a height of the flange portion measured from the surface of the hopper, the first mounting piece of the hinge is fixed to the surface of the hopper on a side of the outlet of the hopper away from the flange portion via the spacer, the second mounting piece is fixed to the frame body with the hinge shaft being arranged along an edge of the frame body;

the toggle latch includes:
  a base fixed to the hopper;
  a toggle lever rotatably fixed to the base; and
  a latch portion rotatably fixed to the toggle lever at a position distant from a center of rotation thereof, a tip portion of the latch portion is configured to be engaged with the tip portion of the hook, and the base of the toggle latch is fixed to the surface of the hopper on a side of the outlet of the hopper away from the flange portion via a second spacer having a height corresponding to the height of the flange portion measured from the surface of the hopper.

* * * * *